June 8, 1948.  E. C. WENTE  2,442,791
ACOUSTIC DEVICE
Filed Sept. 7, 1945
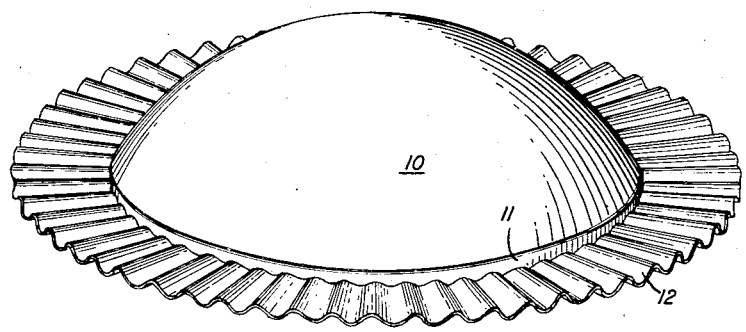
FIG. 1
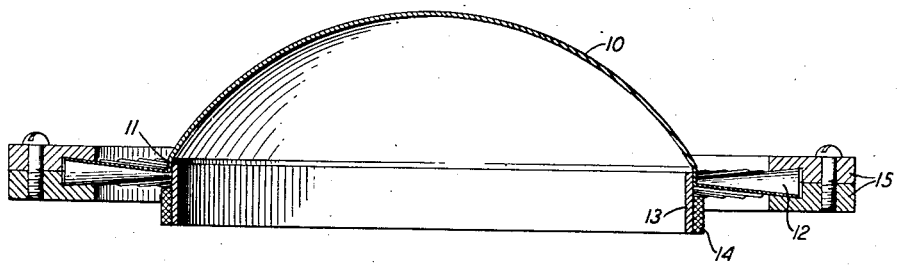
FIG. 2
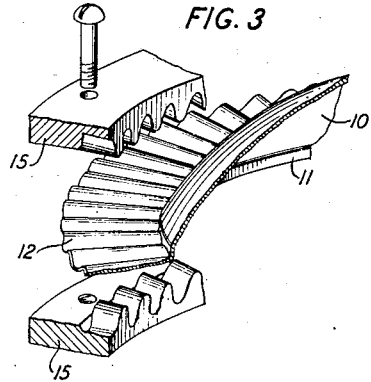
FIG. 3
FIG. 4
INVENTOR
E. C. WENTE
BY
ATTORNEY Patented June 8, 1948

2,442,791

UNITED STATES PATENT OFFICE 2,442,791

ACOUSTIC DEVICE

Edward C. Wente, Summit, N. J., assignor to Bell Telephone Laboratories, Incorporated, New York, N. Y., a corporation of New York Application September 7, 1945, Serial No. 614,939

11 Claims. (Cl. 181—31)

This invention relates to acoustic devices and more particularly to diaphragms especially suitable for use in high power loudspeakers.

In general, in order to realize high operating efficiencies for acoustic devices, such as loudspeakers, it is desirable that the diaphragm mass be small, and to this end the diaphragm may be fabricated of thin lightweight material. Also, in some constructions, in order to realize high operating efficiencies for such devices over a prescribed operating frequency range, the diaphragm is mounted in such manner that its resonance frequency, which is dependent upon the diaphragm mass and the stiffness, is within the operating frequency range and to this end, and also to assure uniformity of response over the range, the diaphragm mounting is made highly flexible and of low mass.

The power capacity of such devices varies, in general, directly with the square of the amplitude of diaphragm motion and the maximum power capacity, therefore, may be limited by the mechanical strain which the diaphragm can withstand. To obtain the desired low mass and high power capacity, the diaphragm or the major portion thereof may be domed. For a device including a diaphragm having a portion constructed, e. g. domed, to safely withstand a given acoustic load, attainment of high efficiency and large power capacity requires that the diaphragm mounting provide low mass and the necessary stiffness and permit maximum diaphragm vibration amplitudes without failure of the mounting, and more specifically without strain of the mounting beyond the fatigue limit of the material thereof.

In accordance with one feature of this invention, the diaphragm mounting in an acoustic device is so constructed that the aforementioned desiderata, namely low mass, requisite stiffness and restriction of strain to safe values, are achieved.

More specifically, in accordance with one feature of this invention, in a diaphragm having a central or main bodily vibratile portion and a flexible portion, the latter is constructed to provide the desired stiffness and so that all parts of the mounting portion material undergo substantially the same strain, i. e. all carry the same amount of potential energy per unit volume, the maximum of which is below the fatigue limit of the material and sufficiently great to permit maximum vibrational amplitude of the bodily vibratile portion of the diaphragm.

In one illustrative embodiment of this invention, the diaphragm mounting portion is annular, clamped at its outer edge portion and radially corrugated, the corrugations being of depth which is a maximum at the edge portion and decreases linearly to a minimum, e. g. substantially zero, at the periphery of the bodily vibratile portion of the diaphragm. The maximum depth and the length of the corrugations are made such as to provide the desired diaphragm stiffness and to permit vibration of the bodily vibratile portion at the maximum it can withstand safely.

The invention and the above noted and other features thereof will be understood more clearly and fully from the following detailed description with reference to the accompanying drawing in which:

Fig. 1 is a perspective view of a diaphragm constructed in accordance with this invention;

Fig. 2 is a sectional view of a mounting, diaphragm and driving coil assembly for a moving coil loudspeaker illustrative of one embodiment of this invention;

Fig. 3 is a fragmentary view showing the transverse configuration of the corrugations in the diaphragm and of the clamping rings illustrated in Fig. 2; and Fig. 4 is an outline diagram showing the transverse configuration of the corrugations in a diaphragm illustrative of another embodiment of this invention.

Referring now to the drawing, the diaphragm illustrated in Fig. 1 comprises a central, circular, domed portion 10 having a cylindrical flange 11 at its periphery and a radially corrugated, annular flexible mounting portion 12. Advantageously, the diaphragm is fabricated in one piece of thin lightweight material such as Duralumin. The annular portion 12 may be corrugated by the use of suitable dies.

Affixed to the flange 11 is a cylindrical coil form 13, also for example of metal, which carries a cylindrical driving coil 14. The coil may be of aluminum wire, adjacent turns being insulated from one another, and secured to the coil form 13 by a suitable adhesive. In an acoustic device, such as a loudspeaker, the coil is disposed in an annular gap in a magnet, not shown, and carries the signal currents.

The outer marginal part of the flexible mounting portion 12 is held securely between a pair of supports or clamping rings 15, the clamping faces of which, as illustrated in Fig. 3, correspond accurately to the diaphragm surfaces engaged thereby. Because of the accurate fit between and conformance of the surfaces, sliding motion between the diaphragm mounting portion and the clamping rings is substantially prevented and losses due to friction at the interfaces are substantially eliminated.

The domed portion 10, which is vibratile bodily, as in accordance with signal currents supplied to the coil 14, is designed to withstand safely the maximum acoustic load thereon when the device of which it forms a part is operated at its maximum capacity. The flexibile mounting portion 12, as noted heretofore, also is constructed so that it can withstand safely the strains produced therein when the device is operated at its maximum capacity. In general, in moving coil devices including diaphragms constructed in accordance with this invention, this capacity will be limited not by the diaphragm but by the maximum power which can be dissipated safely in the driving coil.

The principles involved in the construction of a diaphragm mounting portion in accordance with this invention will be understood from the following considerations. For practical purposes, the mounting portion 12 may be considered analogous to a cantilever beam fixed at one margin between the clamping rings 15 and having a concentrated load applied thereto at its inner margin, by the driving coil 14. The maximum fiber stress at any section in such a beam loaded at one end and fixed at the other is equal to $$\frac{My}{I}$$

where M is the bending moment at the section, I is the moment of inertia of the section and $y$ is the distance from the center of gravity to the outermost part of the boundary of the section. The bending moment is equal to the product of the load and the distance $x$, from the free end of the beam and, of course, is a maximum at the fixed end of the beam. It will be seen that no loss in load carrying capacity would be entailed if the cross-section of the beam varied so that the maximum safe stress at any section was substantially equal to but not greater than that at the fixed end, i. e., if the cross-section varied so that $$\frac{I}{y}$$

were proportional to $x$. Similarly, in the annular mounting portion 12, no loss of load carrying capacity, or viewed in another way no reduction in maximum safe stress, obtains if this portion is so constructed that at any radial distance $r$ from the centre of the diaphragm $$\frac{I}{y}$$

is proportional to $(r-a)$, where $a$ is the radial distance to the inner edge of the mounting portion 12.

For practical purposes this condition is realized by making the corrugations in the annular mounting portion of a depth which is a maximum at the outer margin of this portion and decreases linearly to a minimum, substantially zero, at the flange 11. The maximum depth of the corrugations and the length of the corrugations, i. e. the radial width of the mounting portion, are made such as to provide the stiffness requisite to place the diaphragm resonance at the desired frequency and so that the stress at the outer margin of this portion, i. e. at the inner edge of the clamping rings 15, is below the failure value for maximum diaphragm displacement. The optimum transverse configuration of the corrugations, from the standpoint of most effective use of material, is rectangular as indicated in outline in Fig. 4. However, in cases where the diaphragm is of metal and the corrugations are die formed, because of limits upon the workability of the material, it is generally more practicable to have the corrugations of curved, generally sinusoidal, transverse configuration as illustrated in Figs. 1 and 3.

In an illustrative device, a diaphragm of the construction illustrated in Fig. 1 may have a domed portion 10 eight inches in diameter and a mounting portion 12 approximately two inches in radial width and formed of .0054 mil thick Duralumin. Such a diaphragm has an effective mass of 15 grams, has an edge stiffness of $500 \times 10^6$ dynes per centimeter and can be driven at a root mean square amplitude of about 0.04 centimeter without danger of failure from fatigue. For a device wherein the maximum safe power dissipation in the driving coil is about 300 watts, a diaphragm of the construction specified is capable of radiating over 1 kilowatt of acoustic power at an efficiency for the device of about 77 per cent at 1000 cycles. For maximum diaphragm displacement at higher frequencies even greater acoustic power outputs could be realized but practically the maximum is limited by the safe coil dissipation.

Although specific embodiments of the invention have been shown and described, it will be understood that they are but illustrative and that various modifications may be made therein without departing from the scope and spirit of this invention as defined in the appended claims.

What is claimed is:

1. An acoustic device comprising a diaphragm having a circular bodily vibratile main portion and a substantially radially corrugated, flexible mounting portion, the corrugations in said mounting portion being of depth increasing away from said bodily vibratile portion, and support means engaging said mounting portion at regions thereof remote from said bodily vibratile portion.

2. An acoustic device in accordance with claim 1 wherein the depth of said corrugations increases linearly with distance from said bodily vibratile portion.

3. An acoustic device in accordance with claim 1 wherein said corrugations are of substantially sinusoidal cross-section.

4. An acoustic device in accordance with claim 1 wherein said corrugations are of rectangular cross-section.

5. An acoustic device comprising a diaphragm having a stiffened radiating portion and a corrugated mounting portion encompassing and extending outwardly from the periphery of said stiffened portion, each of the corrugations in said mounting portion extending substantially normal to said periphery and being of depth increasing away from said periphery, and support means holding said mounting portion adjacent the outer margin thereof.

6. An acoustic device comprising a diaphragm having a main vibratile portion and a flexible portion adjacent thereto having corrugations therein extending from adjacent the margin of said main vibratile portion and increasing in depth with distance from said main vibratile portion, and support means clamping said flexible portion at a region thereof remote from said margin.

7. An acoustic device comprising a diaphragm having a bodily vibratile, circular central portion and an annular, flexible mounting portion encompassing and extending outwardly from the margin of said central portion, said mounting portion having corrugations therein extending from adjacent said margin and increasing in depth substantially linearly with distance therefrom, and rigid support means fixing said mounting portion at its periphery.

8. An acoustic device in accordance with claim 7 wherein said corrugations are of substantially sinusoidal transverse section.

9. An acoustic device comprising a diaphragm having a circular bodily vibratile radiating portion and a substantially radially corrugated mounting portion, and supporting means engaging the peripheral part of said mounting portion, the surfaces of said means engaging said part being undulated and conforming to said corrugations.

10. An acoustic device comprising a diaphragm having a domed central portion and an annular, radially corrugated, flexible mounting portion encompassing said central portion and extending outwardly from the margin thereof, the corrugations in said mounting portion increasing in depth with distance from said margin, support means engaging said mounting portion adjacent the periphery thereof, and actuating means coupled to said diaphragm adjacent said margin.

11. An acoustic device in accordance with claim 10 wherein said corrugations are of substantially sinusoidal transverse section and increase in depth substantially linearly with distance from said margin, the depth at said margin being substantially zero.

EDWARD C. WENTE.

REFERENCES CITED

The following references are of record in the file of this patent:

UNITED STATES PATENTS

| Number | Name | Date |
|---|---|---|
| 1,014,240 | Macdonald | Jan. 9, 1912 |
| 1,664,988 | Mobley | Apr. 3, 1928 |
| 1,757,107 | Baltzley | May 6, 1930 |
| 1,775,294 | Poroma | Sept. 9, 1930 |
| 1,962,374 | Woolf et al. | June 12, 1934 |
| 2,014,297 | Rutledge | Sept. 10, 1935 |
| 2,109,955 | Carson | Mar. 1, 1938 |

FOREIGN PATENTS

| Number | Country | Date |
|---|---|---|
| 321,430 | Great Britain | Nov. 8, 1929 |